(12) United States Patent
Barrett et al.

(10) Patent No.: US 9,309,987 B2
(45) Date of Patent: Apr. 12, 2016

(54) ELECTRONIC CONTROL VALVE HAVING AN INTEGRAL NON-CONTACT NOISE MITIGATION DEVICE

(71) Applicant: DELPHI TECHNOLOGIES, INC., Troy, MI (US)

(72) Inventors: John Barrett, Cheektowaga, NY (US); Timothy J. Skinner, East Amherst, NY (US); Ernesto J. Gutierrez, Amherst, NY (US); Matthew R. Warren, Buffalo, NY (US); Joseph M. Bona, Williamsville, NY (US)

(73) Assignee: Mahle International GmbH, Stuttgart (DE)

( * ) Notice: Subject to any disclaimer, the term of this patent is extended or adjusted under 35 U.S.C. 154(b) by 0 days.

(21) Appl. No.: 14/628,634

(22) Filed: Feb. 23, 2015

(65) Prior Publication Data

US 2015/0167859 A1    Jun. 18, 2015

Related U.S. Application Data

(63) Continuation of application No. 13/467,511, filed on May 9, 2012, now abandoned.

(51) Int. Cl.
| | |
|---|---|
| F16K 31/06 | (2006.01) |
| F04B 7/00 | (2006.01) |
| F04B 39/00 | (2006.01) |
| F04B 39/10 | (2006.01) |
| F04B 53/10 | (2006.01) |
| F04B 27/14 | (2006.01) |
| F04B 49/22 | (2006.01) |

(52) U.S. Cl.
CPC ........... *F16K 31/0696* (2013.01); *F04B 7/0076* (2013.01); *F04B 27/14* (2013.01); *F04B 39/0027* (2013.01); *F04B 39/10* (2013.01); *F04B 49/225* (2013.01); *F04B 53/1082* (2013.01); *F16K 31/0655* (2013.01)

(58) Field of Classification Search
CPC . F16K 31/0655; F16K 31/0696; F16K 31/06; F16K 31/0686
USPC .......................................... 251/48, 64, 129.15
See application file for complete search history.

(56) References Cited

U.S. PATENT DOCUMENTS

| | | | |
|---|---|---|---|
| 5,352,101 A | 10/1994 | Morinigo et al. | |
| 8,915,482 B2 * | 12/2014 | Weiβ et al. | ............ 251/129.15 |

(Continued)

OTHER PUBLICATIONS

Supplementary European Search Report Dated Nov. 20, 2014.
International Search Report Jul. 27, 2012.

*Primary Examiner* — Matthew W Jellett
(74) *Attorney, Agent, or Firm* — Brinks Gilson & Lione

(57) ABSTRACT

An electronic control valve having a valve stationary portion defining a substantially central bore extending along an axis of the valve, and a valve train including a movable member of the valve. The valve train moveable member is disposed in the central bore, and the valve train is adapted for reciprocal movement along the axis. A mass is engaged is with the valve train and adapted for reciprocal movement along the axis. A biasing means is disposed between the valve train and the mass. Reciprocal movements of the mass along the axis induced by forces exerted along the axis by the valve train are transmitted through the biasing means, whereby reciprocal movement of the valve train along the axis is dynamically reduced by the mass.

17 Claims, 7 Drawing Sheets

(56) References Cited

U.S. PATENT DOCUMENTS

| | | | |
|---|---|---|---|
| 9,022,354 B2 * | 5/2015 | Szermutzky et al. | ......... 251/337 |
| 2005/0025632 A1 | 2/2005 | Urbank et al. | |
| 2009/0183786 A1 | 7/2009 | Iwa et al. | |
| 2009/0205347 A1 | 8/2009 | Cochran et al. | |
| 2010/0143162 A1 | 6/2010 | Warren | |

* cited by examiner

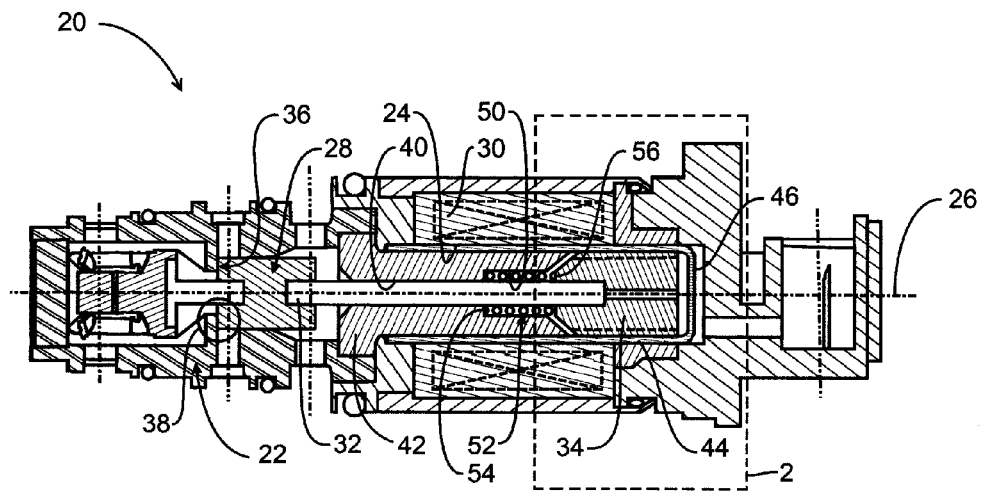
FIG. 1 (Prior Art)
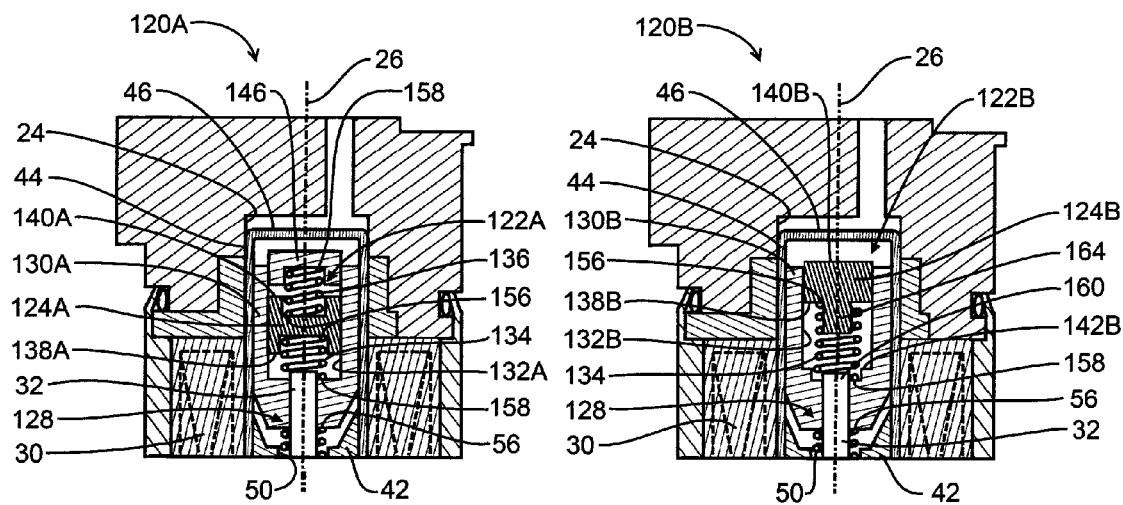
FIG. 2A  FIG. 2B

ELECTRONIC CONTROL VALVE HAVING AN INTEGRAL NON-CONTACT NOISE MITIGATION DEVICE

CROSS-REFERENCE TO RELATED APPLICATIONS

This application is a continuation application of U.S. patent application Ser. No. 13/467,511 filed on May 9, 2012, the disclosure of which is incorporated herein by reference in its entirety.

BACKGROUND OF THE INVENTION

The present disclosure relates to electronic control valves; specifically, to a noise mitigation device for an electronic control valve; more specifically, to such a device acting as a dynamic absorber of valve train motion.

An electronic control valve (eCV) generates an undesirable audible noise over a given supply current range. This noise is caused by the moving portion of the valve, i.e., the valve train, repetitively impacting a stationary portion of the valve, e.g., the valve seat.

An eCV may be used, for example, in an automotive air conditioning system to control compressor capacity by regulating gas entering the compressor crankcase. A prior such eCV is shown in FIG. 1. Higher eCV supply current increases compressor capacity and lower eCV supply current decreases compressor capacity. The eCV current can be changed by changing the applied voltage. In the case of today's vehicles, the applied voltage is changed by pulsing battery voltage on and off, typically at 400 Hz. One 400 Hz cycle is 2.5 milliseconds. Thus, a 400 Hz eCV is regulated through pulse width modulation (PWM), i.e., by altering the portion of each 2.5 millisecond period (the PWM cycle) that a voltage pulse is present. Duty cycle is the time fraction of the PWM cycle that the eCV is energized. The duty cycle represents that time fraction of each PWM cycle during which an energizing voltage pulse is present as a percentage, with average voltage and current increasing as a function of an increased duty cycle. At 50% duty cycle, full voltage is applied for 1.25 milliseconds and no voltage is applied for 1.25 milliseconds. Audible eCV noise is greatest near 50% duty cycle because the valve train can be driven at its maximum displacement in both directions. When energized, the eCV is activated and the actuating magnetic field of the valve pushes against the valve train inertia and a return spring. When the actuator is de-energized, the eCV is unactivated and the return spring pushes the valve train back towards its off-mode rest position. At low duty cycle the valve train has less time to accelerate toward the valve seat. At high duty cycle, the valve train has less time to accelerate back towards its rest position. With lower displacement, the valve train velocity is lower and cannot impact the valve seat with such a high contact force.

The eCV must be a very low friction device to function properly. Conceptually, a good eCV design approaches a classic spring mass system which is frictionless and has very low damping. The result is relatively high amplitude valve train cyclic motion excited by the supply voltage frequency, also known as the forcing frequency. At around 50% duty cycle the valve train repetitively strikes the valve seat at the frequency of the supply voltage with high velocity. The repetitive impact creates an audible, undesirable buzzing noise.

This noise is a function of, but not limited to: supply voltage frequency; coil inductance; valve train mass; valve train return spring force; valve train damping; and valve seat geometry. Prior efforts to minimize this valve noise in automotive applications include: changing coil inductance by increasing coil size; changing supply voltage frequency; changing supply voltage waveform characteristics; adding friction by direct contact between the valve train and valve body; suppressing noise transmission through air and structure; changing valve seat impact zone compliance; changing valve train mass; and changing valve train return spring force.

Some such efforts have proven somewhat effective, but have not been successful in satisfactorily resolving the problem for various reasons. Changing coil inductance by increasing coil size is effective, but increases cost and packaging. Changing supply voltage frequency or waveform characteristics is effective, but is not acceptable to most customers. Adding friction by direct contact between the valve train and valve body is effective, but negatively impacts valve performance and has proven unpredictable during valve operation. Suppressing noise transmission through air and structure is partially effective, but increases cost and negatively impacts durability and packaging. Changing valve seat impact zone compliance is effective, but negatively impacts performance and durability. Changing valve train mass or return spring force has not been effective within reasonable limits.

In practice, prior attempts to solve this problem by eCV suppliers have primarily involved adding direct contact friction between the valve train and valve body via various methods such as: adding grease between the valve train and valve body; utilizing an O-ring to provide friction between valve train and valve body; and configuring the actuating magnetic field to be non-symmetrical, whereby the field induces a friction-generating side load between valve train and valve body. As noted above, however, introducing friction directly between the valve train and the valve body impairs valve performance and introduces performance unpredictably.

A noise mitigation device that overcomes the shortcomings of the above-discussed prior efforts would be a desirable advancement in the relevant art.

SUMMARY OF THE INVENTION

The integration of a non-contact noise mitigation device (NMD) eliminates undesirable eCV noise by reducing the supply voltage frequency induced valve train reciprocating motion. This device is directly coupled to the noise source.

The integral, non-contact NMD does not rely on unpredictable friction. Instead it mitigates primary drive frequency effects by dynamically reducing valve train reciprocation motion. In other words, the NMD serves as a dynamic motion absorber or reducer. The NMD opposes the valve train motion with a mass in transient motion approximately 180° out of phase with the valve train motion. The NMD includes a mass that is connected to the valve train by biasing means (e.g., a spring or spring system) that transmits forces between the NMD mass and the valve train along the axis of the valve train motion. The biasing means may include solid, liquid, or gas components capable of storing and transferring mechanical energy. The exemplary embodiments herein illustrated employ one or more coil springs as the biasing means.

The present invention provides an electronic control valve having a valve stationary portion defining a substantially central bore extending along an axis of the valve, and a valve train including a movable member of the valve. The valve train moveable member is disposed in the central bore, and the valve train is adapted for reciprocal movement along the axis. A mass is engaged with the valve train and adapted for reciprocal movement along the axis. A biasing means is disposed between the valve train and the mass. Reciprocal movements of the mass along the axis induced by forces exerted along the axis by the valve train are transmitted through the biasing means, whereby reciprocal movement of the valve train along the axis is dynamically reduced by the mass.

BRIEF DESCRIPTION OF THE DRAWINGS

The above-mentioned and other features and objects of the invention, and the manner of attaining them, will become more apparent, and the invention itself will be better understood, by reference to the following description of an exemplary embodiment of the invention representing its best mode, taken in conjunction with the accompanying drawings, wherein:

FIG. 1 is a cross-sectioned horizontal view of a prior eCV;

FIG. 2A is an enlarged, vertical view of outlined area 2 of FIG. 1, showing an eCV according to a first embodiment of the present invention having an NMD with dual biasing means;

FIG. 2B is similar to FIG. 2A, showing an eCV according to a second embodiment of the present invention having an NMD with a single biasing means;

Figure 3:
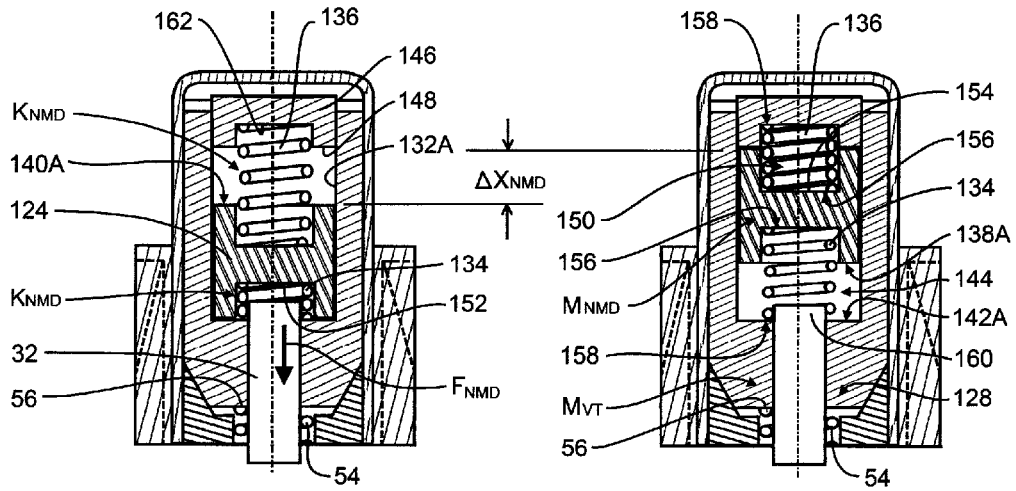
FIG. 3 provides partial views of the first embodiment eCV of FIG. 2A, showing the mass at its limits of travel, and indicating parameters used in tuning the NMD to a particular valve forcing frequency.

Corresponding reference characters indicated corresponding parts throughout the several views. Although the drawings represent an embodiment of the present invention, the drawing are not necessarily to scale or to the same scale and certain features may be exaggerated in order to better illustrate and explain the present invention.

DETAILED DESCRIPTION OF EXEMPLARY EMBODIMENT(S) OF THE INVENTION

FIG. 1 shows a prior eCV 20 of a known, commercially available type that operates in the above-described manner, for use in the air conditioning system (not shown) of an automobile. Although shown horizontally oriented, the prior and inventive eCVs disclosed herein may be oriented otherwise, and the effects of gravity on the valve train and NMD are herein ignored. The eCV 20 includes a valve body 22 having stationary portions and a central bore 24 that extends along an axis 26. Inside the valve body 22 is an elongate valve train 28 slidably disposed in the bore 24 and having reciprocating movement along the axis 26 relative to the stationary portions of the valve body 22. Surrounding the central bore 24 and extending along the axis 26 is a cylindrical activation coil 30 that is intermittently energized with battery voltage during eCV operation at the forcing frequency, which is typically 400 Hz.

Included among the members of the valve train 28 is an elongate shaft 32 fixed to and interconnecting other members of the valve train. Included among the other valve train members is a generally cylindrical, ferrous plunger 34 affixed to one end of the shaft 32. The plunger 34 is driven leftwardly, as viewed in FIG. 1, along the axis 26 towards a valve seat 36, by the magnetic actuating field generated by the coil 30 when the eCV 20 is electrically activated. The valve seat 36 is a stationary portion of the valve body 22 and the site 38 where valve train 28 impacts the valve body 22 in the prior eCV 20.

Referring still to FIG. 1, the shaft 32 is radially supported by the central bore 40 of a stationary, cylindrical bearing member 42 of the valve body 22. The bearing member 42 is a stationary part of the valve body 22. The plunger 34 and the bearing member 42 are disposed within a stationary, tubular cage member 44, the rightward end of which has a lateral wall 46. A portion of the cage member 44 is surrounded by the coil 30. The circumferential outer surface of the plunger 34 slidably engages, or has a slight clearance to, the cylindrical interior surface of the cage member 44.

Referring still to FIG. 1, the bearing member 42 is provided with a counterbore 50 in which is disposed one end 52 of a return spring 54. The return spring 54 is a compression coil spring having axially opposite ends and which surrounds the shaft 32. The other end 56 of the return spring 54 abuts the plunger 34, and the return spring 54 thus biases the plunger 34 rightwardly along the axis 26 toward its rest position. The magnetic actuating force urges the valve train 28 leftward against the biasing force of the return spring 54 and towards the valve seat 36.

As herein described and/or shown in accompany FIGS. 2A-5, an eCV 120 according to the present invention structurally differs from the prior eCV 20. In the first and second embodiments discussed in detail herein, certain portions of the prior eCV 20 shown in the outlined area 2 of FIG. 1 are replaced with components that define an NMD 122. FIGS. 2A and 2B are enlarged views of the outlined area 2, respectively showing the relevant portions of first and second embodiments of eCV 120. The first embodiment eCV 120 is also referred to herein as eCV 120A. The second embodiment eCV 120 is also referred to herein as eCV 120B. Components of the eCV 120 distinguishably configured relative to the first and second embodiments eCV 120A, 120B are respectively indicated with a reference numeral suffix A or B.

Each NMD 122 includes a mass 124 having reciprocating motion along the axis 26, and at least one biasing means through which the mass 124 and the valve train 128 interact. Other than as discussed herein or shown in the accompanying drawings, the valve trains 128 of the first and second embodiments of the eCVs 120 are substantially similar to the valve train 28 of the prior eCV 20. In the first and second embodiments of the eCV 120, the valve train plungers 130 affixed to the shaft 32 are provided with a large central bore 132 in which the NMD 122 is disposed. The NMD mass 124 may, in some embodiments (not shown), be provided with an axially-extending through hole or channel through which fluid may be vented between opposite axial ends of the mass, which may help to facilitate its axial movement.

Referring to FIG. 2A, the first embodiment eCV 120A includes an NMD 122A including a mass 124A located between first and second biasing means 134 and 136, respectively. The mass 124A is substantially cylindrical and provided with axially opposing faces 138A and 140A that respectively engage the biasing means 134 and 136. The plungers 130 of the first and second embodiment eCVs 120 include a surface within the bore 132 that interfaces the mass 124A. The plunger 130A of eCV 120A includes a surface 142A, shown in FIG. 3, that interfaces the mass face 138A. Thus, the first biasing means 134 is disposed in a first chamber 144 defined between a pair of interfacing surfaces 138A, 142A spaced along the axis 26. The first chamber 144 is shown in FIG. 3. With continued reference to FIG. 3, the plunger 130A includes a cylindrical cap 146 affixed to the open end of its central bore 132A. The plunger cap 146, which may or may not be provided with an axially-extending fluid vent hole (not shown), includes a surface 148 that interfaces the mass face 140A. Thus, the second biasing means 136 is disposed in a second chamber 150 defined between a pair of interfacing surfaces 140A, 148.

In the shown first embodiment eCV 120A, the biasing means 134 and 136 are coil compression springs, but the biasing means 134, 136 may alternatively be fluid-type springs that respectively engage the paired surfaces 138A, 142A, and 140A, 148. Various, suitable types of biasing means 134 and/or 136 are represented schematically in FIG. 5 discussed further hereinbelow.

With continued reference to FIG. 3, in the depicted first embodiment eVC 120A, the springs 134, 136 each have opposite first and second ends 156 and 158, respectively. The axial faces 138A, 140A of the cylindrical mass 124A have recessed portions 152, 154 in which the spring first ends 156 are seated. A portion of surface 142A is defined by the end 160 of the shaft 32, and the cap surface 148 has a recessed portion 162, about which and in which are disposed the second ends 158 of the springs 134, 136, respectively.

Referring to FIG. 2B, the second embodiment eCV 120B includes an NMD 122B including a mass 124B that is engaged by a single biasing means. As shown in FIG. 2B, the biasing means is the spring 134. The first end 156 of the spring 134 is retained about a projecting portion 164 of the first mass face 138B, and the second end 158 of the spring 134 is retained about the shaft end 160 and retained relative to the plunger surface 142B. In the second embodiment eCV 120B, the spring 134 may be in compression or tension. Thus, in the eCV 120B, the biasing means 134 is disposed in a chamber 144 defined between a pair of interfacing surfaces 138B, 142B spaced along the axis 26. The opposing mass second face 140B defines a free end of the mass 124B.

The NMDs of the first embodiment eCV 120A, the second embodiment eCV 120B, and other embodiments not herein depicted and utilizing other types of biasing means, are tuned to a particular forcing frequency (e.g., 400 Hz) by similar methods. For the purposes of illustration, however, the description of a method of tuning and the eCV operation that follows is with reference to the first embodiment eCV 120A.

The mass of the valve train 128 ($M_{VT}$) and its displacement ($\Delta X_{VT}$) along the axis 26 may be known parameters, and the selected limits of the NMD mass displacement ($\Delta X_{NMD}$) along the axis 26 may be selected based on packaging constraints. The NMD is designed to have a natural frequency ($f_{nNMD}$) equal to the known supply voltage frequency ($f_{fvt}$, e.g., 400 Hz) and to exert a force ($F_{NMD}$) on the valve train 128 when the mass displacement ($\Delta X_{NMD}$) is 180° out of phase with the valve train displacement ($\Delta X_{VT}$). With reference to FIG. 3, which shows only a portion of the valve train 128 and its mass ($M_{VT}$), to tune the NMD 120 for a typical eCV application, the parameters of the NMD mass ($M_{NMD}$) and spring system stiffness ($K_{NMD}$) must be determined; they may be calculated by the following method:

$M_{NMD}$=mass 124 of the NMD 122

$M_{VT}$=mass of valve train 128 (known, and excludes the NMD mass 124)

$K_{NMD}$=spring system stiffness (e.g., springs 134, 136) of the NMD 122

$\Delta X_{VT}$=displacement of the valve train 128 along the axis 26 (known)

$\Delta X_{NMD}$=displacement of the NMD mass 124 along the axis 26 (selected)

$F_{NMD}$=force exerted by the NMD 122 on the valve train 128

Figure 4A:
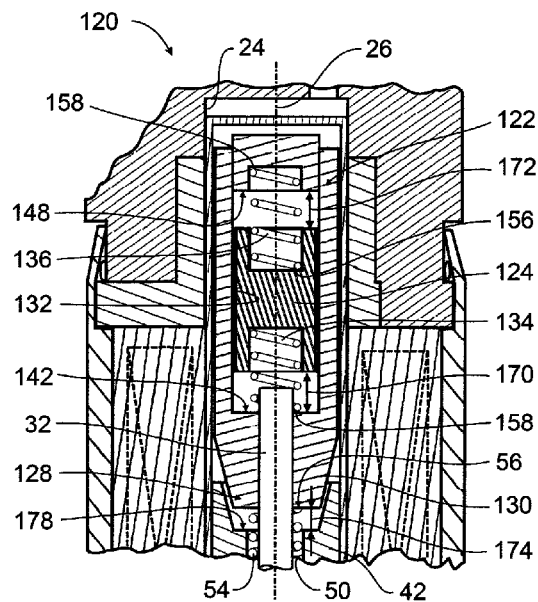
FIG. 4A is a fragmented, cross-sectional view of a vertically-oriented eCV according to the first embodiment showing the eCV (and its containing, unshown air conditioning system) off, with its valve train and NMD at rest; the views of FIGS. 4B-4E are similar to FIG. 4A but at different stages of valve operation.

$f_{fvt}$=supply voltage frequency (forcing frequency, known)
$f_{nNMD}$=natural frequency of the NMD 122
$M_{VT}/M_{NMD}=\Delta X_{VT}/\Delta X_{NMD}$
Solve for $M_{NMD}$: $M_{NMD}=M_{VT}*\Delta X_{NMD}/\Delta X_{VT}$
$f_{nNMD}=f_{fvt}=(1/2\pi)*(K_{NMD}/M_{NMD})^{1/2}$
Thus, $f_{fvt}=(1/2\pi)*(K_{NMD}/(M_{VT}*\Delta X_{NMD}/\Delta X_{VT})^{1/2}$
Solve for $K_{NMD}$: $K_{NMD}=4(\pi f_{fvt})^2*(M_{VT}*\Delta X_{NMD}/\Delta X_{VT})$
$F_{NMD}=K_{NMD}*\Delta X_{NMD}$ FIGS. 4A-4E show the eCV 120 cycling and the resulting reaction of the NMD mass 124. FIG. 4A shows the NMD mass 124 at rest, with the eCV activating voltage off. In FIG.

4A, the distance 170 in a direction parallel with the axis 26 between surfaces 138 and 142, and the distance 172 in a direction parallel with the axis 26 between surfaces 140 and 148, are approximately equal, with the mass 124 supported in an equilibrium position by the spring system, which includes springs 134 and 136. In FIG. 4A, the valve train 128 is supported by the return spring 54 in its resting position, and the gap 174 between the downward-facing surface 176 of the plunger 130 and the interfacing, upward-facing surface 178 of the bearing member 42 is large.

Figure 4B:
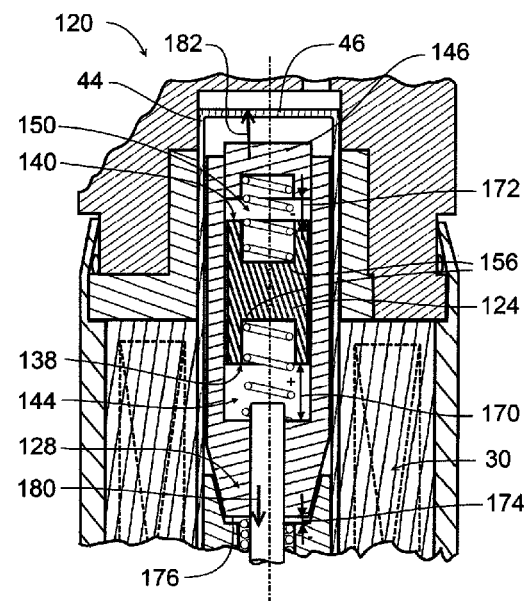
FIG. 4B is a view of the activated eCV at the beginning of its first cycle of operation, during the energized portion of the PWM cycle, showing the valve train moving downwardly relative to the valve body and the mass still at rest, the mass inertia exerting an upward force on the valve train through the upper biasing means.

FIG. 4B shows the eCV 120 at the beginning of its first cycle, with the eCV activating voltage applied to the coil 30. As the valve train 128 starts to move downwardly (as indicated by the arrow 180) due to the supply voltage application to the coil 30, the NMD mass 124 will tend to remain at rest due to its inertia effects. Thus, relative to FIG. 4A, the distance 170 increases and the distance 172 decreases, as indicated by the + and − signs, respectively, and the gap 174 is somewhat smaller, as indicated by the − sign. The NMD mass 124 will eventually move downwardly due to the force exerted on it by the spring system while at the same time, the NMD mass 124 exerts an equal and opposite upward force, indicated by arrow 182, on the valve train 128 through the spring system.

Figure 4C:
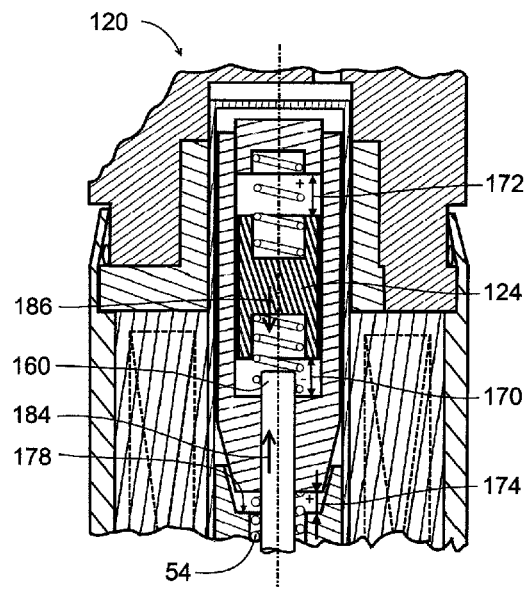
FIG. 4C is a view of the unactivated eCV at the middle of its first cycle of operation, during the de-energized portion of the PWM cycle, showing the valve train moving upwardly under the influence of its return spring and the mass continuing downward movement against the force of the lower biasing means.

FIG. 4C shows the eCV 120 at the middle of its first cycle, with the eCV activating voltage off. The return spring 54 forces the valve train 128 in the upward direction (indicated by the arrow 184), while the mass 124 continues its downward movement. Thus, relative to FIG. 4B, the distance 170 decreases and the distance 172 increases, as indicated by the − and + signs, respectively, and the gap 174 is somewhat larger, as indicated by the + sign. The NMD mass 124 exerts an opposite downward force, indicated by arrow 186, through the spring system opposing the upward motion of the valve train 128.

Figure 4D:
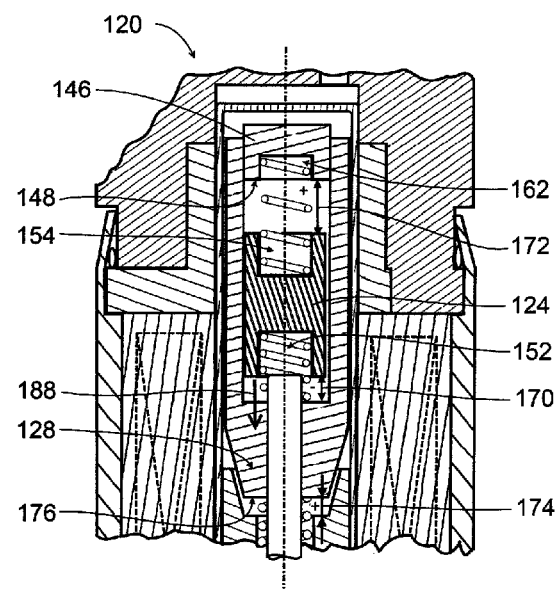
FIG. 4D is a view of the unactivated eCV at the end of its first cycle of operation, showing the valve train at the upward end of its reciprocating movement, with the mass inertia exerting a downward force on the valve train through the lower biasing means.

FIG. 4D shows the eCV 120 at the end of its first cycle, with the eCV activating voltage still off. The valve train 128 has reached a position at the upward end of its travel in this cycle; the mass 124 is near the downward end of its travel in this cycle, and exerts a downward force on the valve train 128, indicated by arrow 188, through the spring system. Relative to FIG. 4C, the distance 170 decreases and the distance 172 increases, as indicated by the − and + signs, respectively, and the gap 174 is somewhat larger, as indicated by the + sign. The size of the gap 174 in FIG. 4D, though large, may differ from the large gap 174 shown in FIG. 4A.

Figure 4E:
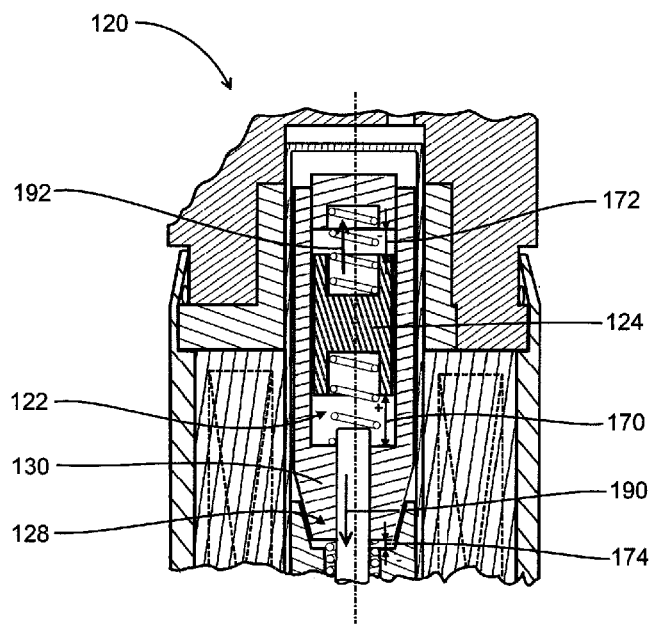
FIG. 4E is a view of the activated eCV at the beginning of its second cycle of operation, showing the valve train moving downwardly and the mass at the upward end of its reciprocating movement, with the mass inertia exerting an upward force on the valve train through the upper biasing means.

FIG. 4E shows the eCV 120 at the beginning of its second cycle, as the eCV activating voltage is applied. As the valve train 128 starts to move downwardly (as indicated by the arrow 190) due to the supply voltage application to the coil 30, the NMD mass 124 approaches the upward end of its movement. Thus, relative to FIG. 4D, the distance 170 increases and the distance 172 decreases, as indicated by the + and − signs, respectively, and the gap 174 is somewhat smaller, as indicated by the − sign. In FIG. 4E, the mass 124 exerts an upward force through the spring system on the valve train 128, indicated by arrow 192, that tends to oppose the actuating force imparted on the plunger 130 by the electromagnetic field, thereby slowing the downward movement of the valve train 128 towards the valve seat 36 (FIG. 1). Impact between the valve train and the valve seat is softened or altogether avoided due to the shorter valve train displacement, slower valve train velocity, reduced valve train momentum at the time of impact, and/or cessation of the activating voltage application to the coil during the longer travel time of the valve train in the direction of the valve seat. Thus, the undesirable, audible noise associated with moving members of the valve train repeatedly impacting stationary portions of the valve body is mitigated by the NMD.

It is to be understood that, for a cyclically applied forcing function, the result is to reduce, but not eliminate, the overall reciprocating motion of the valve train 128 necessary for operation of the eCV 120. The resultant decreased valve train displacement and/or velocity significantly reduces the impact of the valve member on the valve seat, dramatically mitigating the audible noise level during normal operation.

Figure 5:
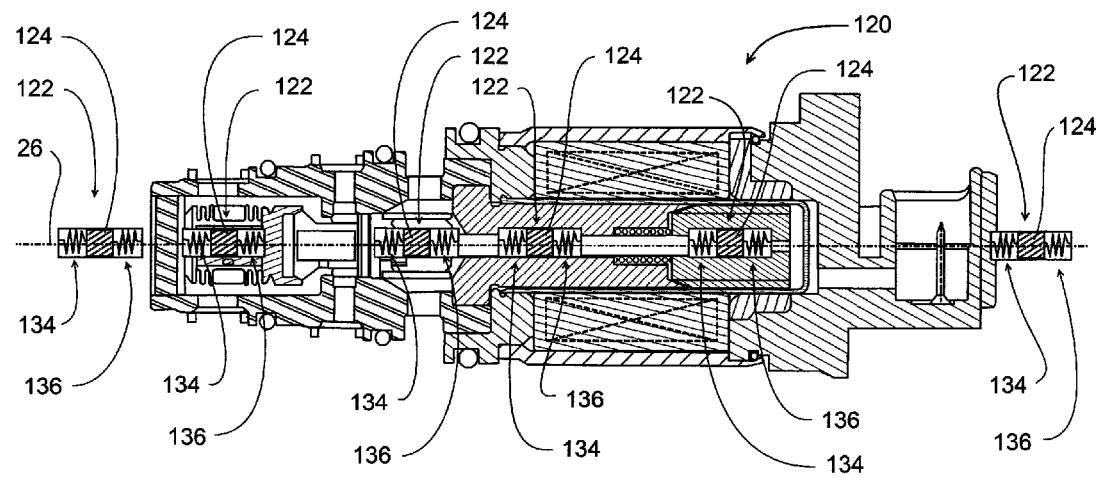
FIG. 5 is a cross-sectioned horizontal view of an eCV according to the present invention schematically indicating alternative locations for an NMD, which is shown according to the first embodiment.

The NMD 122 can be installed anywhere in a eCV 120 as long as it is constrained by the eCV along the axis 26 of valve train 128 travel. FIG. 5 shows six such positions, some of which are internal to the valve body central bore 24, some of which are external to the bore 24. Embodiments of the NMD 122 located outside of the valve body bore may be disposed externally of the valve body 22, and coupled to the valve train 128 via an axially moveable valve train portion extending axially from the valve body and engaging the biasing means of the NMD 120. As noted above, the biasing means shown schematically in FIG. 5 may be any of various, suitable types such as, for example, compression or tension springs, such as above-discussed springs 134 and/or 136, or fluid-type springs. Moreover, though dual biasing means are shown in each NMD 122 of FIG. 5, it is to be understood that any of them may include only a single biasing means.

The effectiveness of the NMD 122 at mitigating noise in an eCV 120 when tuned to its forcing frequency has been demonstrated. Samples of the NMD have been built, existing eCVs modified therewith, and the prototype eCVs tested. The NMDs were designed with a resonant frequency of 400 Hz. They were intended to function optimally at 400 Hz, which is the most common eCV supply voltage forcing frequency.

Figure 6:
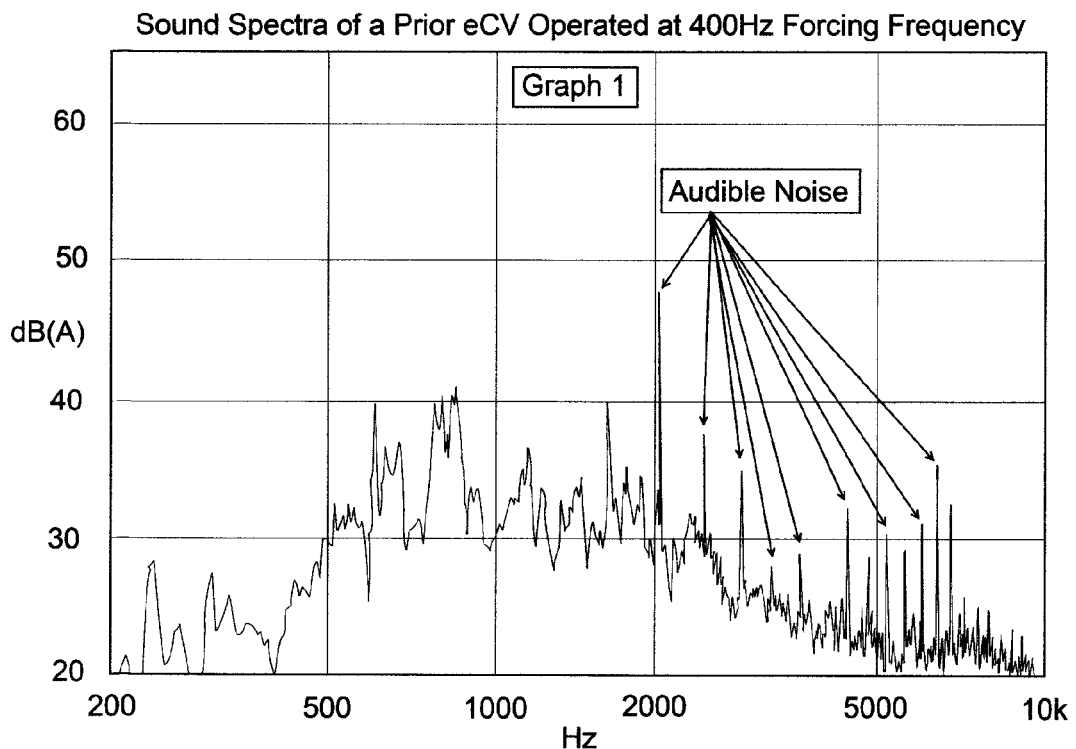
FIG. 6 shows Graph 1, which shows the sound pressure spectra of the prior eCV of FIG. 1 installed in the air conditioning system of a test vehicle and operated at a forcing frequency of 400 Hz.

Graph 1, shown in FIG. 6, shows the sound pressure spectra of a prior eCV representative of current eCV technology (shown in FIG. 1) installed in the air conditioning system of a test vehicle and operated at a forcing frequency of 400 Hz. The sound pressure was measured outside of the test vehicle. There are multiple discrete peaks in the amplitude of the noise spectra at multiples of the 400 Hz forcing frequency, which is a characteristic of audible buzz noise.

Figure 7:
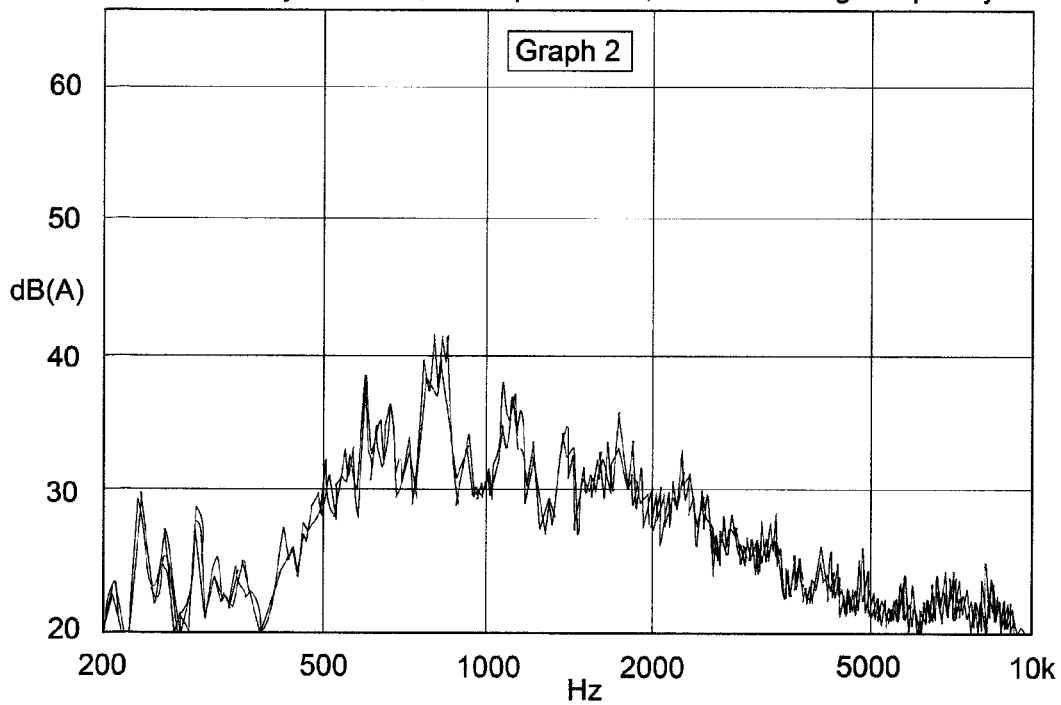
FIG. 7 shows Graph 2, which shows the sound spectra of three eCVs according to the first embodiment of present invention, each nominally tuned to a forcing frequency of 400 Hz and tested at conditions identical to those which produced the prior eCV results shown in Graph 1 (FIG. 6)

Graph 2, shown in FIG. 7, shows the sound spectra of three eCVs according to the first embodiment, each equipped with a prototype dynamic absorber (i.e., the NMD) nominally tuned to a forcing frequency of 400 Hz. These three eCVs were tested at conditions identical to those of the prior eCV that produced the results shown in Graph 1 (FIG. 6). These three eCVs were subjectively quieter than the prior eCV whose test results are shown in Graph 1. Those of ordinary skill in the art will appreciate that these three eCVs did not exhibit the characteristic spectra of audible buzz noise reflected in Graph 1.

Figure 8:
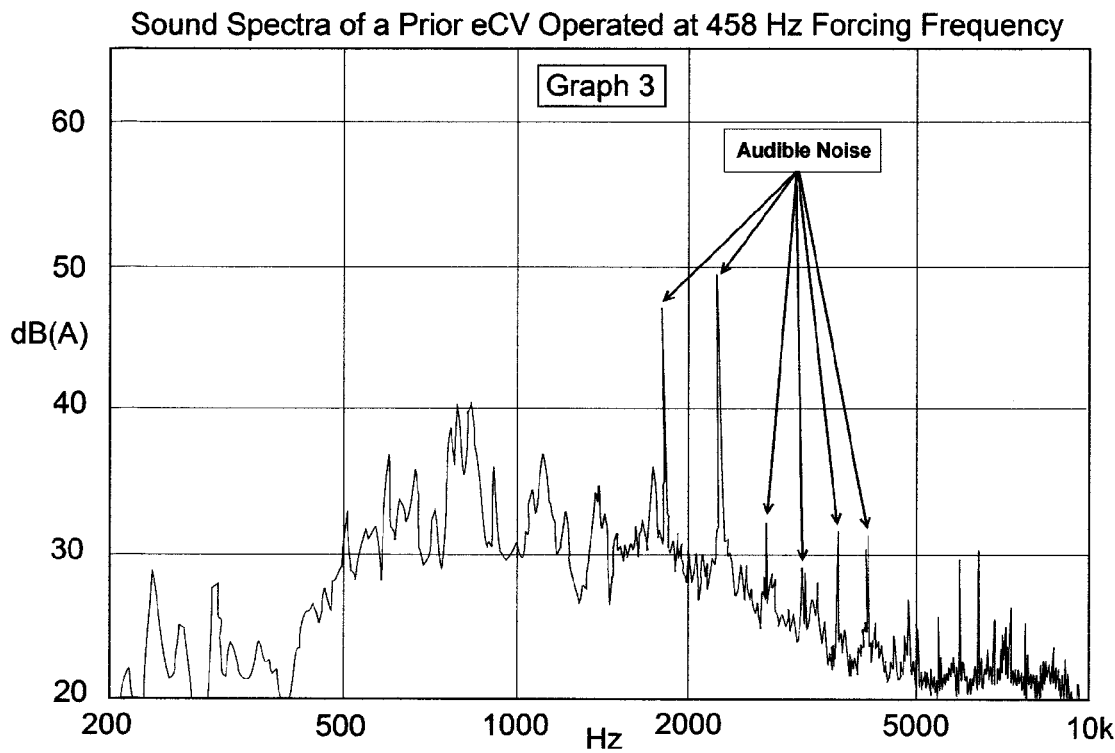
FIG. 8 shows Graph 3, which shows the sound spectra of the prior eCV when tested at an eCV forcing frequency of 458 Hz.

Graph 3, shown in FIG. 8, shows the sound spectra of the prior eCV (previously tested at a 400 Hz forcing frequency, see Graph 1, FIG. 6) when tested at a forcing frequency of 458 Hz. Those of ordinary skill in the art will notice that the multiple discrete peaks in the amplitude of the noise spectra are now at multiples of the 458 Hz forcing frequency, which is another characteristic of audible buzz noise.

Figure 9:
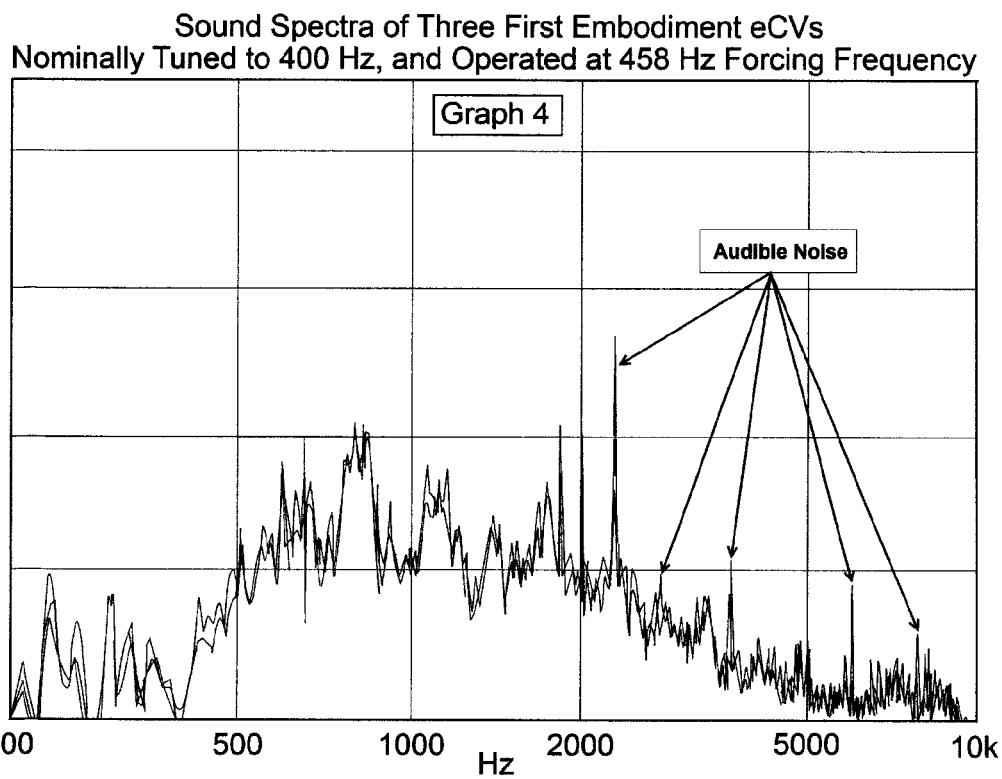
FIG. 9 shows Graph 4, which shows the sound spectra of the three eCVs according to the first embodiment nominally tuned to 400 Hz when tested at an off-design forcing frequency of 458 Hz.

Graph 4, shown in FIG. 9, shows the sound spectra of the three eCVs according to the first embodiment nominally tuned to 400 Hz (previously tested at a 400 Hz forcing frequency, see Graph 2, FIG. 7) when tested at a forcing frequency of 458 Hz. As expected, compared to its performance when activated at the 400 Hz forcing frequency, the dynamic valve train motion absorber (i.e., the NMD) is not as effective at reducing the audible buzz noise when activated at off-design forcing frequency conditions.

A known phenomena of prior eCVs such as eCV 20 of FIG. 1, which typically operate under 400 Hz PWM cycles, is that the valve train fails to obey the PWM control signals within a narrow duty cycle range. The preferred 400 Hz PWM schema is a compromise between lower frequency systems which result in greater valve train travel and higher noise levels, and higher frequency systems which generate relatively less valve train travel and noise, but often cause the valve to stick, resulting in performance and reliability issues. Consequently, OEM customers have adopted and continue to specify 400 Hz PWM systems for actuating refrigerant system eCVs.

At 400 Hz, however, prior eCVs typically experience operating points at which the valve train fails to obey the activating PWM signals; at such points, which may be a relatively narrow subrange of control current values, there is a control response discontinuity. The operating points at which the control response discontinuities occur may actually be narrow subranges of control current values in the much larger range between the minimum and maximum control current values. In other words, at such operating points, there is a discontinuity between the electrical control signals received at the coil 30 of the prior eCV 20, and the mechanical response by its valve train 28. Notably, the control response discontinuity issue is not as pronounced as lower and higher PWM cycle frequencies. Those frequencies, however, have attendant noise and valve sticking issues, as discussed above. It is believed that, in a 400 Hz PWM system, the control discontinuity results from the valve train 28 impacting the valve seat 36 such that it bounces off of the seat at these operating points or narrow duty cycle ranges, the bouncing of the valve train 28 overriding the desired control response at the duty cycle(s) corresponding to the time-averaged activating current level(s). The inadvertent bouncing of the valve train affects the control properties of the eCV 20, impairing performance and generating additional noise. It has been discovered that, in addition to the above-identified objectives and advantages of the present invention, the eCV 120 addresses the control response discontinuity issue.

Figure 10:
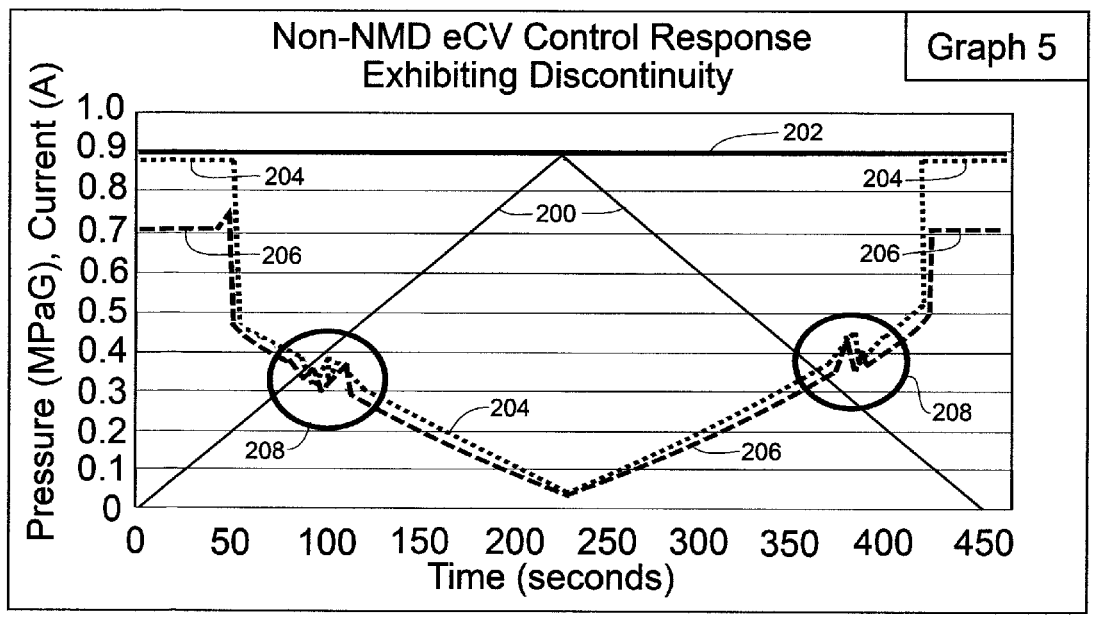
FIG. 10 shows Graph 5, which indicates various simulated refrigeration system pressures over time when equipped with a prior PWM-controlled eCV operating at 400 Hz, as the prior eCV's average control current level increases and decreases between minimum and maximum values, indicating discontinuities in the valve train control response.

FIG. 10 shows Graph 5, which depicts plots of various air pressures simulating refrigerant pressures in an air conditioning system having a prior 400 Hz PWM eCV, such as eCV 20 of FIG. 1, located on the suction side of the refrigeration compressor. The plots are over a 450 second period during which the time-averaged control current, represented by curve 200, is linearly increased from a minimum or zero amps (A) corresponding to a zero percent duty cycle, to a maximum of 0.9 A corresponding to a 100 percent duty cycle, and back again to zero. Air pressures simulating refrigerant at compressor discharge, crankcase, and suction pressures are plotted as curves 202, 204, and 206, respectively. Within encircled areas 208 of FIG. 10 are clear areas of suction and crankcase pressure fluctuations in curves 204 and 206 at control current levels in the range of about 0.35 to 0.40 A indicative of valve train control response discontinuities.

Figure 11:
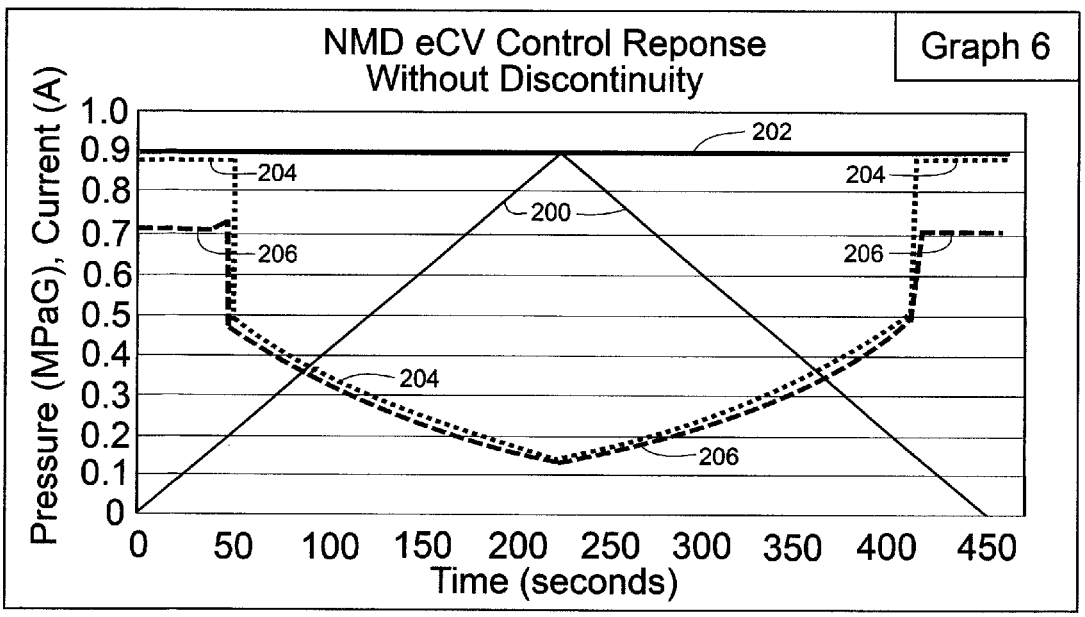
FIG. 11 shows Graph 6, which is similar to Graph 5 (FIG. 10) but indicating various simulated refrigeration system pressures over time when equipped with an eCV according to the present invention operating under the conditions that produced the results shown in Graph 5, as the inventive eCV's average control current level increases and decreases between minimum and maximum values, demonstrating the valve train control response being substantially devoid of the discontinuities exhibited with the prior eCV.

FIG. 11 shows Graph 6, which depicts plots of air simulating refrigerant at compressor discharge, crankcase, and suction pressures 202, 204, 206, respectively, in an air conditioning system utilizing a eCV 120 under the same operating conditions experienced in generating the plotted data of FIG. 10, as the control current is increased from zero to 0.9 A, and back again to zero. The valve train control response to the PWM signals demonstrated by crankcase and suction pressure curves 204 and 206 is substantially devoid of discontinuities. These results demonstrate that an eCV 120 provides the additional advantage of solving the prior known issue of valve train control response discontinuities in 400 Hz PWM systems. It is believed that the NMD 122 precludes bouncing of the valve train 128 off of the valve seat in a eCV 120 at control current levels between the range of zero and 0.9 A, and provides a smooth, predictable control response between these minimum and maximum control current levels, thereby improving performance and reliability relative to the prior eCV 20.

While this invention has been described in terms of a preferred, exemplary embodiment thereof, it may be further modified within the spirit and scope of its disclosure to the extent set forth in the claims that follow. This application is therefore intended to cover any variations, uses, or adaptations of the invention using its general principles. Further, this application is intended to cover such departures from the present disclosure as come within know or customary practice in the art to which this invention pertains.

What is claimed is:

1. An electronic control valve, comprising:
   a valve stationary portion defining a substantially central bore extending along an axis of the valve;
   a valve train including a movable member of the valve and a central cavity, the movable member disposed in the central bore, the valve train adapted for reciprocal movement along the axis;
   a mass disposed inside the central cavity of the valve train and engaged with the valve train and adapted for reciprocal movement along the axis; and
   a biasing means disposed between the valve train and the mass, reciprocal movements of the mass along the axis being induced by forces exerted along the axis by the valve train transmitted through the biasing means, whereby reciprocal movement of the valve train along the axis is dynamically reduced by the mass.

2. The electronic control valve of claim 1, wherein the biasing means comprises a spring disposed between interfacing surfaces of the mass and the valve train.

3. The electronic control valve of claim 2, wherein the spring has opposite first and second ends spaced along the axis, the spring first end engaged with a first surface located on the mass, the spring second end engaged with a second surface located on the valve train.

4. An electronic control valve, comprising:
   a valve stationary portion defining a substantially central bore extending along an axis of the valve;
   a valve train including a movable member of the valve, the movable member disposed in the central bore, the valve train adapted for reciprocal movement along the axis;
   a mass engaged with the valve train and adapted for reciprocal movement along the axis;
   a first biasing means disposed between the valve train and the mass, reciprocal movements of the mass along the axis being induced by forces exerted along the axis by the valve train transmitted through the biasing means, whereby reciprocal movement of the valve train along the axis is dynamically reduced by the mass, wherein first biasing means is disposed between a first pair of interfacing surfaces of the mass and the valve train, and
   a second biasing means disposed between the valve train and the mass, reciprocal axial movements of the mass induced by axial forces exerted by the valve train transmitted through the second biasing means.

5. The electronic control valve of claim 4, wherein the first biasing means comprises a first spring having a pair of opposite ends spaced along a direction parallel with the axis, and the second biasing means comprises a second spring having a pair of opposite ends spaced along a direction parallel with the axis, the second spring disposed between interfacing surfaces of the mass and the valve train.

6. The electronic control valve of claim 5, wherein the second spring is disposed between a second pair of interfacing surfaces of the mass and the valve train.

7. The electronic control valve of claim 5, wherein the second spring has a pair of opposite ends spaced along the axis, one of the second spring ends engaged with a third surface located on the mass, the other of the second spring ends engaged with a fourth surface located on the valve train.

8. The electronic control valve of claim 7, wherein the mass first and third surfaces are spaced along the axis, and the first and second springs are compression coil springs.

9. The electronic control valve of claim 4, wherein the second biasing means is disposed between a second pair of interfacing surfaces of the mass and the valve train.

10. The electronic control valve of claim 1, wherein the mass and the valve train define a chamber of variable volume containing the biasing means.

11. The electronic control valve of claim 1, the mass carried by the valve train movable member.

12. The electronic control valve of claim 11, the biasing means carried by the valve train movable member.

13. The electronic control valve of claim 4, wherein the mass is located outside of the central bore.

14. The electronic control valve of claim 13, the biasing means located outside of the central bore.

15. The electronic control valve of claim 1, wherein reciprocal movement of the valve train along the axis is opposed by inertia-induced forces transmitted between the mass and the valve train through the biasing means.

16. The electronic control valve of claim 1, wherein reciprocal movement of the valve train along the axis is partially a mechanical response to electromagnetic forces exerted on the valve train, the electromagnetic forces generated by pulsed electrical signals of variable duration having a range of time-averaged control current levels corresponding to electrical signal pulse lengths over a cycle, whereby the valve train has a control response to changes in control current levels within the range, the control response substantially devoid of discontinuities over the range.

17. The electronic control valve of claim 16, wherein the range of control current levels extends from a minimum value corresponding to a pulse duration of zero percent of the cycle and a maximum value corresponding to a pulse duration of 100 percent of the cycle.

* * * * *